(12) United States Patent
Pohl

(10) Patent No.: US 9,295,930 B2
(45) Date of Patent: Mar. 29, 2016

(54) DEVICE FOR FILTERING A PLASTIC MELT

(71) Applicant: MAAG PUMP SYSTEMS GMBH, Grossostheim (DE)

(72) Inventor: Harald Pohl, Horstel (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 214 days.

(21) Appl. No.: 13/870,904

(22) Filed: Apr. 25, 2013

(65) Prior Publication Data

US 2013/0292316 A1 Nov. 7, 2013

Related U.S. Application Data

(63) Continuation of application No. PCT/EP2011/005351, filed on Oct. 24, 2011.

(51) Int. Cl.
*B01D 35/26* (2006.01)
*B29C 47/68* (2006.01)
*B29C 47/00* (2006.01)

(52) U.S. Cl.
CPC .............. *B01D 35/26* (2013.01); *B29C 47/687* (2013.01); *B29C 47/0009* (2013.01); *B29C 47/681* (2013.01)

(58) Field of Classification Search
None
See application file for complete search history.

(56) References Cited

U.S. PATENT DOCUMENTS

| 4,070,138 A * | 1/1978 | Stanwood ................ 425/144 |
| 5,449,459 A * | 9/1995 | Glaser et al. ............ 210/498 |
| 6,533,934 B1 * | 3/2003 | Trendelkamp et al. ...... 210/236 |

FOREIGN PATENT DOCUMENTS

| CN | 1575961 A | 2/2005 |
| CN | 201058263 Y | 5/2008 |
| DE | 3419822 A1 | 11/1985 |
| DE | 3742964 A1 | 8/1988 |
| EP | 1502724 A1 | 2/2005 |
| GB | 792252 A | 3/1958 |

* cited by examiner

*Primary Examiner* — Benjamin Kurtz
(74) *Attorney, Agent, or Firm* — Buskop Law Group, PC; Wendy Buskop

(57) ABSTRACT

A device for filtering a plastic melt, having a housing that has at least one inlet passage and at least one outlet passage for the plastic melt. The at least one inlet passage is separated from the at least one outlet passage by at least one filter cavity for accommodating at least one filter piston that is axially displaceable therein. The at least one filter piston has at least one filter base body with a filter surface with filter openings passing through the filter base body there, through which openings the plastic melt passes into a filtrate cavity in the filter base body. The filtrate cavity is fluidically connected to the at least one outlet passage, and the filter surface of the filter base body is enclosed by a flexible, elastic filter screen in such a manner that this filter screen can be clamped onto the filter base body there.

20 Claims, 2 Drawing Sheets

DEVICE FOR FILTERING A PLASTIC MELT

CROSS REFERENCE TO RELATED APPLICATIONS

The present application is a Continuation application and claims priority to and the benefit of co-pending International Patent Application No. PCT/EP2011/005351, filed on Oct. 24, 2011, entitled "DEVICE FOR FILTERING A PLASTIC MELT," which claims priority to DE Application No. 202010014709.3, which was filed on Oct. 23, 2010. These references are incorporated in their entirety herein. This reference is hereby incorporated in its entirety.

FIELD

The present embodiments generally relate to a device for filtering a plastic melt, such as a thermoplastic melt.

BACKGROUND

A need exists for a device for filtering a plastic melt with a filter screen arrangement that is reliable in operation while also being easy and fast to replace is ensured in a simply constructed manner.

The present embodiments meet these needs.

BRIEF DESCRIPTION OF THE DRAWINGS

The detailed description will be better understood in conjunction with the accompanying drawings as follows.

Figure 1:
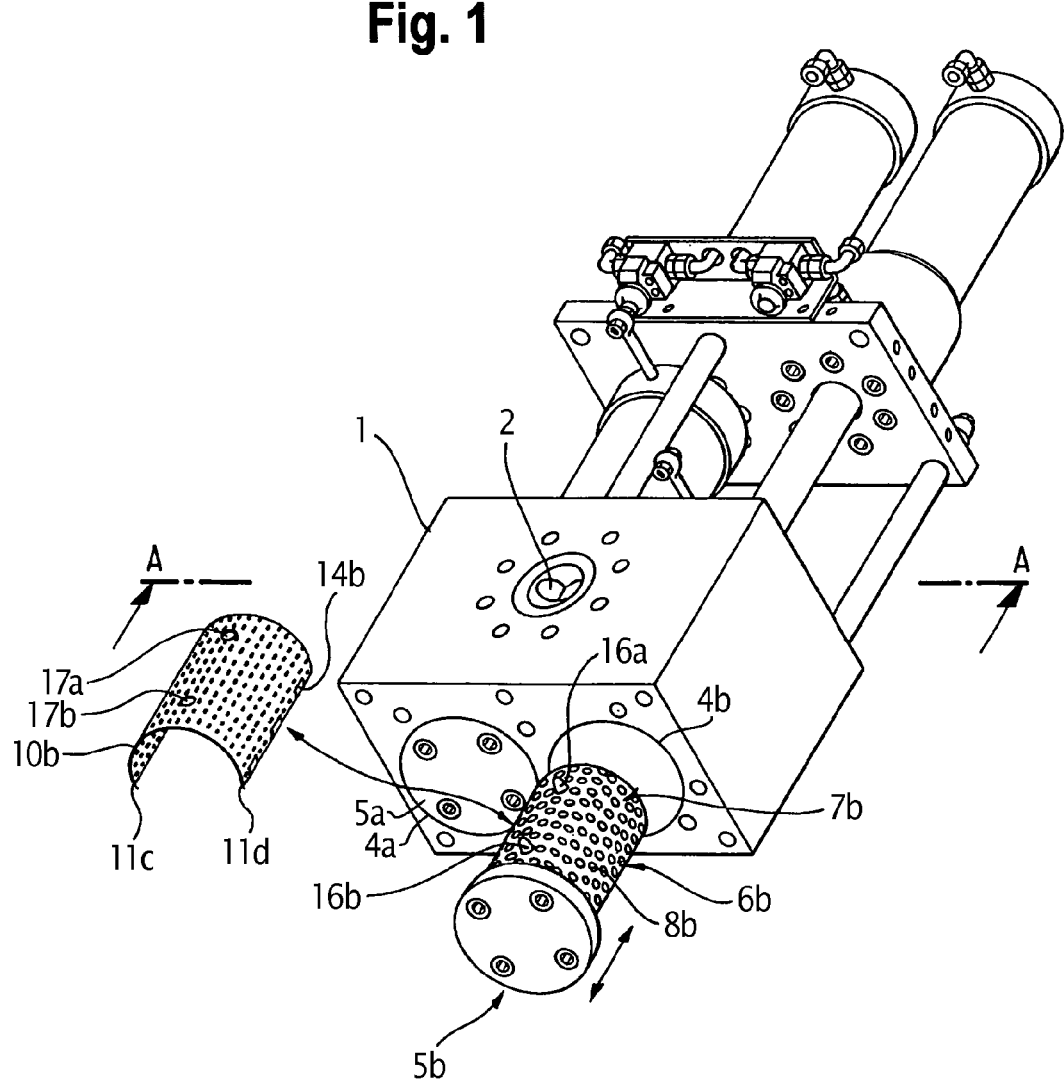
FIG. 1 depicts a schematic representation of a device for filtering a thermoplastic melt.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a device for filtering a plastic melt, such as a thermoplastic melt.

The device can have a housing. The housing can have at least one inlet passage and at least one outlet passage for the plastic melt. The at least one inlet passage can be separated from the at least one outlet passage by at least one filter cavity.

The at least one filter cavity can be a cylindrical filter cavity. A filter piston can be located in the at least one filter cavity, and the filter piston can be axially displaceable in the at least one filter cavity. The filter piston can be arranged in such a precise manner inside the at least one filter cavity that, with no additional sealing means, plastic melt is prevented from being able to undesirably force its way between an applicable outer wall of the filter piston and an applicable inner wall of the at least one filter cavity, even in the event of an axial displacement of the filter piston.

The filter piston can have at least one filter base body with a filter surface. The filter surface can have filter openings passing through the filter base body. The plastic melt can pass through the openings into a filtrate cavity in the filter base body, and the filtrate cavity can be fluidically connected to the at least one outlet passage. The plastic melt travels from the outer region of the filter base body inward to the filtrate cavity in the filter base body, in which process the plastic melt is conveyed accordingly to the filter cavity of the housing through the inlet passage, and is carried away from there through the filtrate cavity and the outlet passage in the housing fluidically connected thereto.

Unlike other devices described in the prior art, the filter surface of the filter base body is enclosed by a flexible, elastic filter screen in such a manner that the flexible, elastic filter screen can be clamped onto the filter base body there. Accordingly, the flexible, elastic filter screen itself is designed to be sufficiently rigid yet simultaneously flexible and elastic that it surrounds the filter base body in a self-clamping manner, at least in the region of the filter surface. Consequently, the design and handling of a filter element with corresponding flexible, elastic filter screen can be simplified by the means that the flexible, elastic filter screen itself is designed to be rigid and elastically flexible, and thus the flexible, elastic filter screen of this nature encloses the filter surface and can be clamped onto the filter base body there without additional fastening elements being required. Moreover, the flexible, elastic design of the flexible, elastic filter screen can also be rigid enough, for example made of a metal material, that buckling or wrinkling of the screen material cannot occur during attachment according to the invention of such a flexible, elastic filter screen, as can adversely be the case with the mat-like screen materials according to the prior art that are attached with separate fasteners. Therefore, the operation of such a filter device becomes especially reliable, and replacement of a flexible, elastic filter screen for maintenance can take place especially easily and quickly.

The flexible, elastic filter screen can be clamped onto the filter surface and can have a curved cross-sectional shape. The flexible, elastic filter screen can also follow the correspondingly curved contour of the filter surface or filter base body there.

In order to be able to prevent possible dead spaces in the region of the filter device, as much as possible, so that operation of such a filter device is especially reliable, and in order to ensure the clamping action of the flexible, elastic filter screen on the filter base body in the region of the filter surface to a particular degree, the contour of the flexible, elastic filter screen can follow the contour of the filter surface viewed in cross-section.

The clamping action can be achieved such that the flexible, elastic filter screen clamped onto the filter surface encloses an angle viewed in cross-section of a minimum of 180° and a maximum of 270° of the circumference of the filter piston there. For example, the filter surface encloses an angle viewed in cross-section of approximately 240° of the circumference there. The flexible, elastic filter screen can cover the corresponding circumferential portion of the filter surface there. Consequently, such incomplete enclosure also ensures that the flexible, elastic filter screen is relatively simple to remove from the filter surface again.

The filter piston can have, at least in the region of the filter base body and in the region where the fluidic connection exists between the filtrate cavity and the outlet passage, a filter base part that has an outer contour corresponding in cross-section to the inner contour of the filter cavity in the housing and that has no filter surface there. The dead space volume can thus be further reduced, and moreover the axial guidance of the filter piston in the filter cavity of the housing can consequently be improved, so that by this means as well no plastic melt to be filtered can pass between the filter piston there and the housing.

The alignment and securing of the flexible, elastic filter screen can be achieved, for example, by the means that the flexible, elastic filter screen is held by axial terminating edges on both sides in respective axial grooves in the above-described filter base part. In addition to the actual clamping, this results in especially reliable guidance of the flexible, elastic filter screen.

In one or more embodiments, it is possible for at least two positioning pins to be provided in the region of the filter base body so that the flexible, elastic filter screen with corresponding openings therein can be placed thereon, and is thus held, by which means the corresponding advantages of the additional guidance described in the previous paragraph are also achieved here. In this embodiment, moreover, the further advantage is achieved that it is not necessary to provide grooves, which could more easily become clogged with the plastic melt.

In order to simplify handling during installation and removal of the flexible, elastic filter screen, the flexible, elastic filter screen can have, at least in the region of each of its axial terminating edges, one or more handling eyes so that a handling tool can be applied there to spread the filter screen. In this way, the process of replacing the flexible, elastic filter screens can be carried out especially quickly and easily.

As already described above, the shape of the filter cavity or of the filter piston therein can be cylindrical. With regard to this design, the filter cavity can be circular in cross-section and the filter base body can have the shape in cross-section of at least one or more section(s) of a circular segment with different diameters. Such shapes are especially simple to manufacture structurally, and have especially favorable flow characteristics for the melt stream passing through so that the operation of a device thus designed in accordance with the invention can be especially reliable.

In useful fashion, the filter piston can be axially displaceable between a filtering position and a non-filtering position. The displacement here can usefully be accomplished by means of a (separate) hydraulic device.

The filter piston can have, in addition to the filter base body, a piston section that corresponds in cross-section to the cross-section of the filter cavity in the housing so that it fills this filter cavity in the non-filtering position. Consequently, in the event of, for example, replacement of the flexible, elastic filter screen according to the invention, the supply and discharge of plastic material to be filtered can be discontinued in a simple design manner by this means alone.

The term "plastic melt" used in the present description can refer, in particular, to a polypropylene, polyethylene, high-pressure polypropylene, low-pressure polyethylene, linear low-pressure polyethylene, polystyrene, polyamide, acrylonitrile butadiene styrene (ABS), polyester, polyoxymethylene (POM), polyacrylate, polymethyl methacrylate (PMMA), or polyvinyl chloride melt. It must further be stated that the elements of the device according to the invention described as cylindrical or circular can accordingly also have polygonal shapes.

Figure 2:
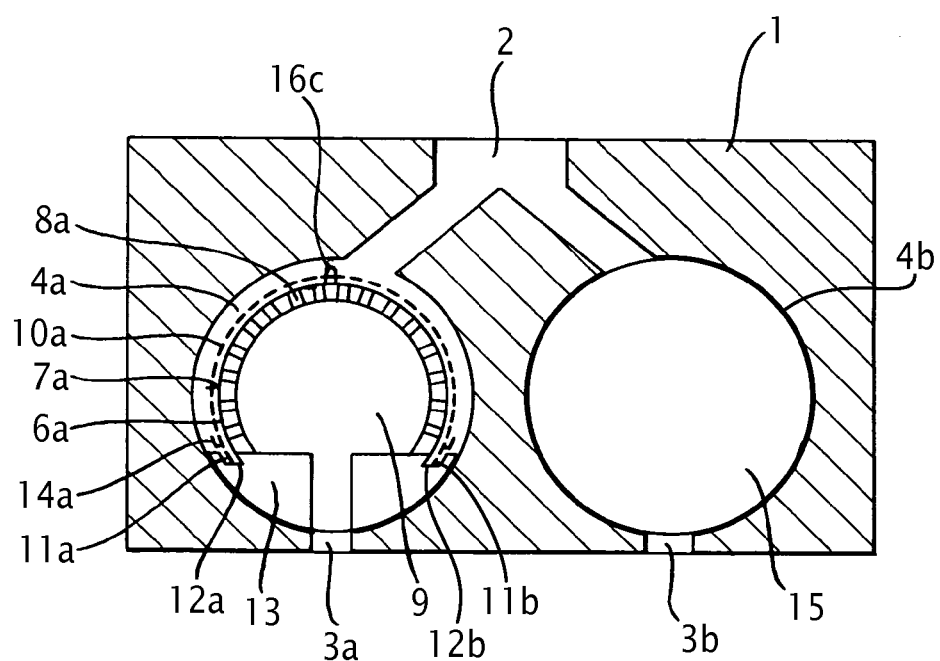
FIG. 2 depicts a partial view in cross-section along the line A-A in FIG. 1.

Turning now to the Figures, FIG. 1 depicts a schematic of a device for filtering a plastic melt. The device can have a housing 1. FIG. 2 shows the embodiment of the device according to the invention in cross-section along the line A-A in FIG. 1.

Referring to FIGS. 1 and 2, the housing 1 can have two filter cavities 4a and 4b, with each of the filter cavities 4a and 4b being provided with a filter piston 5a and 5b that is axially displaceable therein. The axial displaceability is indicated by the corresponding double-headed arrow at the bottom right in FIG. 1. In order to achieve the axial displacement of the filter pistons 5a and 5b, hydraulic elements are associated with each piston. The filter pistons 5a and 5b are arranged next to one another. Here, the left-hand filter piston 5a is shown in a filtering position, and the right-hand piston 5b is shown in a non-filtering position.

Viewed in the direction of flow of the plastic melt to be filtered, the melt enters the housing 1 through an inlet passage 2, then travels through the inlet passage 2 that is divided in a Y-shape into each one of the filter cavities 4a and 4b in the housing 1 where it is passed through the applicable filter base body 6a and 6b with a filter surface 7a and 7b through the filter openings, such as filter openings 8a and 8b therein, through which openings the plastic melt passes into one or more filtrate cavities, such as filtrate cavity 9, in the filter base body 6a, and then travels from one or more of the filtrate cavities, such as filtrate cavity 9, to the at least one outlet passage 3a and 3b fluidically connected thereto, and thus out of the housing 1 again. In some cases, the precise position of the elements and passages or cavities cannot be seen in full in FIG. 1, but is shown more precisely in connection with FIG. 2.

As can be seen in the Figures, the filter surface 7a and 7b of the filter base body 6a and 6b in each case is enclosed by a removable, flexible, elastic and yet nevertheless inherently rigid flexible, elastic filter screen 10a and 10b, which is to say not implemented in the manner of a mat, so that this flexible, elastic filter screens 10a and 10b can be clamped onto the filter base body 6a and 6b there. The flexible, elastic filter screens 10a and 10b here can be held by each of its axial terminating edges 11a, 11b, 11c and 11d in a respective axial groove. For example, as shown in FIG. 2 with axial terminating edges 11a and 11b engaging axial grooves 12a and 12b in a filter base part 13.

At least two positioning pins, such as 16a, 16b, and 16c are also provided in the upper region of the filter base bodies 6a and 6b so that the flexible, elastic filter screens 10a and 10b can be placed with corresponding openings 17a and 17b thereon, and is thus held. The flexible, elastic filter screens 10a and 10b have handling eyes, such as a first handling eye 14a and a second handling eye 14b, in the region of each of its axial terminating edges, so that a handling tool can be applied there to spread the flexible, elastic filter screens 10a and 10b. The contour of the flexible, elastic filter screens 10a and 10b follows the contour of the filter surfaces 7a and 7b. In this design, as shown in the drawings, the flexible, elastic filter screen that can be clamped onto the filter surfaces 7a and 7b is designed to be curved in cross-section, and encloses approximately 240° of the circumference of the filter pistons 5a and 5b there, with the flexible, elastic filter screens 10a and 10b covering the corresponding circumferential portion of the filter surfaces 7a and 7b.

As already noted, in the device according to the invention shown in FIG. 1 and FIG. 2, the left-hand filter piston 5a is in a filtering position (working position), while the right-hand piston 5b is depicted in the non-filtering position in which the filter surface 7b of that filter base body 6b is freely accessible from the outside so that in this position the flexible, elastic filter screen 10b, which is laden with dirt particles for example, can be replaced by a clean flexible, elastic filter screen as indicated by the double-headed arrow in FIG. 1.

The filter pistons 5a and 5b are matched to the diameter of the applicable filter cavities 4a and 4b in the housing 1 such that even with an axial displacement of the filter pistons 5a and 5b in the applicable direction of the arrow in FIG. 1, no leakage occurs, and thus plastic melt cannot undesirably emerge here, either in the filtering position or in the non-filtering position. To this end the filter pistons 5a and 5b additionally have, adjacent to the filter base bodies 6a and 6b and the filter base part 13, piston sections, such as piston section 15, that corresponds in cross-section to the cross-section of the filter cavities 4a and 4b in the housing 1. The filter cavities 4a and 4b is thus suitably filled in the non-filtering position.

As can be seen especially well in FIG. 2, the inlet passage 2 in the housing 1 divides in a Y-shape into two subsidiary passages, with a partial flow of the plastic melt to be filtered being delivered to the left-hand filter cavity 4a and the left-hand filter piston 5a located there in the filtering position, and a partial flow being delivered to the right-hand filter-cavity 4b and the right-hand filter piston 5b located there in the non-filtering position. It can be seen especially well in the right-hand side of FIG. 2 that the right-hand filter piston 5b also has the piston section 15 that corresponds in cross-section to the cross-section of the right-hand filter cavity 4b in the housing 1, so that it fills this right-hand filter cavity 4b in the non-filtering position. As shown in the drawing, each filter cavity 4a and 4b has a separate outlet passage 3a and 3b, whereas it would also be possible for the applicable outlet passages 3a and 3b to be joined together again in the housing 1 and to exit the housing 1 in a common outlet opening (although this is not shown, however).

Clearly visible on the left in the cross-section from FIG. 2, next to the filter base body 6a, is the filter base part 13, the outer contour of which corresponds in cross-section to the inner contour there of the left-hand filter cavity 4a of the housing 1, and has no filter surface there. The left-hand filter base body 6a has the filter surface 7a through which the plastic melt passes via filter openings 8a into the filtrate cavity 9 in the filter base body 6a, wherein the filtrate cavity 9 is fluidically connected to the outlet passage 3a in the filtering position visible on the left in FIG. 2. According to the invention, the filter surface 7a of the filter base body 6a is enclosed by the flexible, elastic filter screen 10a such that this flexible, elastic filter screen 10a can be removably clamped onto the filter base body 6 there. The flexible, elastic filter screen 10a is guided axially by axial terminating edges 11a and 11b on both sides in respective axial grooves 12a and 12b in the filter base part 13, as can be seen on the left in FIG. 2.

While these embodiments have been described with emphasis on the embodiments, it should be understood that within the scope of the appended claims, the embodiments might be practiced other than as specifically described herein.

What is claimed is:

1. A device for filtering a plastic melt, wherein the device comprises:
   a. a housing, wherein the housing has at least one inlet passage and at least one outlet passage for the plastic melt;
   b. at least one filter cavity separating the at least one inlet passage from the at least one outlet passage;
   c. at least one filter piston disposed within the filter cavity, wherein the at least one filter piston is axially displaceable therein, wherein the at least one filter piston comprises:
      (i) at least one filter base body with a filter surface; wherein the filter surface has filter openings passing through the filter base body; and
      (ii) a filtrate cavity formed in the filter base body, wherein the plastic melt passing through the filter openings pass into the filtrate cavity, and wherein the filtrate cavity is fluidically connected to the at least one outlet passage; and
      (iii) a flexible, elastic filter screen enclosing the filter surface, wherein the flexible, elastic filter screen self-clamps onto the filter base body.

2. The device of claim 1, wherein the flexible, elastic filter screen has a contour that follows the contour of the filter surface.

3. The device of claim 2, wherein the flexible, elastic filter screen has a curved cross-section.

4. The device of claim 1, wherein the flexible, elastic filter screen has a curved cross-section.

5. The device of claim 1, wherein flexible, elastic filter screen encloses an angle viewed in cross-section of a minimum of 180° and a maximum of 270° of the circumference of the filter piston and covers the corresponding circumferential portion of the filter surface there.

6. The device of claim 2, wherein flexible, elastic filter screen encloses an angle viewed in cross-section of a minimum of 180° and a maximum of 270° of the circumference of the filter piston and covers the corresponding circumferential portion of the filter surface there.

7. The device of claim 3, wherein flexible, elastic filter screen encloses an angle viewed in cross-section of a minimum of 180° and a maximum of 270° of the circumference of the filter piston and covers the corresponding circumferential portion of the filter surface there.

8. The device of claim 4, wherein flexible, elastic filter screen encloses an angle viewed in cross-section of a minimum of 180° and a maximum of 270° of the circumference of the filter piston and covers the corresponding circumferential portion of the filter surface there.

9. The device of claim 8, wherein the filter piston has, at least in the region of the filter base body and in the region where the fluidic connection exists between the filtrate cavity and the outlet passage, a filter base part that has an outer contour corresponding in cross-section to the inner contour there of the filter cavity in the housing and that has no filter surface there.

10. The device of claim 1, wherein the filter piston has, at least in the region of the filter base body and in the region where the fluidic connection exists between the filtrate cavity and the outlet passage, a filter base part that has an outer contour corresponding in cross-section to the inner contour there of the filter cavity in the housing and that has no filter surface there.

11. The device of claim 10, wherein the flexible, elastic filter screen is held by axial terminating edges on both sides in respective axial grooves in the filter base part.

12. The device of claim 1, wherein the flexible, elastic filter screen is held by axial terminating edges on both sides in respective axial grooves in the filter base part.

13. The device of claim 12, wherein at least two positioning pins are provided in the region of the filter base body so that the flexible, elastic filter screen can be placed thereon with corresponding filter openings, and is thus held.

14. The device of claim 1, wherein at least two positioning pins are provided in the region of the filter base body so that the flexible, elastic filter screen can be placed thereon with corresponding filter openings, and is thus held.

15. The device of claim 14, wherein the flexible, elastic filter screen has, at least in the region of each of its axial terminating edges, one or more handling eyes so that a handling tool can be applied there to spread the flexible, elastic filter screen.

16. The device of claim 15, wherein the filter cavity is circular in cross-section and the filter base body has the shape in cross-section of at least one or more section(s) of a circular segment with different diameters.

17. The device of claim 1, wherein the filter cavity is circular in cross-section and the filter base body has the shape in cross-section of at least one or more section(s) of a circular segment with different diameters.

18. The device of claim 17, wherein the filter piston is axially displaceable between a filtering position and a non-filtering position.

19. The device of claim 1, wherein the filter piston is axially displaceable between a filtering position and a non-filtering position.

20. The device of claim 1, wherein the filter piston has, in addition to the filter base body, a piston section that corresponds in cross-section to the cross-section of the filter cavity in the housing so that it fills this filter cavity in the non-filtering position.

* * * * *